United States Patent [19]

Cuccolini

[11] Patent Number: 4,615,370
[45] Date of Patent: Oct. 7, 1986

[54] DEVICE FOR SELECTING THE TOOLS OF THE TOOL CARRYING HEAD OF TIRE REMOVAL MACHINES IN GENERAL

[75] Inventor: Maria Cuccolini, Correggio Emilia, Italy

[73] Assignee: Corghi Elettromeccanica S.p.A., Correggio Emilia, Italy

[21] Appl. No.: 668,146

[22] Filed: Nov. 5, 1984

[30] Foreign Application Priority Data

Nov. 4, 1983 [IT] Italy .............................. 46874 A/83

[51] Int. Cl.⁴ ............................................ B60C 25/08
[52] U.S. Cl. .................................. 157/1.24; 157/1.28
[58] Field of Search .................... 157/1.24, 1.26, 1.28; 51/166 T; 408/35

[56] References Cited

U.S. PATENT DOCUMENTS

| | | | |
|---|---|---|---|
| 2,707,855 | 5/1955 | Miller | 51/166 T |
| 3,100,520 | 8/1963 | May et al. | 157/1.24 |
| 3,791,434 | 2/1974 | Duquesne | 157/1.24 |
| 3,847,198 | 11/1974 | Brosene, Jr. | 157/1.24 |
| 4,047,553 | 9/1977 | Kotila | 157/1.24 |
| 4,095,489 | 6/1978 | Hasegawa | 408/35 X |

*Primary Examiner*—James G. Smith
*Attorney, Agent, or Firm*—Brisebois & Kruger

[57] ABSTRACT

A device for selecting the tools of the tool carrying head of tire removal machines in general comprises a hydraulic cylinder-piston unit (17) arranged to cause a tool carrying head (6, 7) to rotate, and connected in parallel with a hydraulic cylinder-piston unit (11) which causes a bar (1) on which the head (6, 7) is rotatably mounted to swivel in a vertical plane. A sequence valve (31) is provided in that pipe connecting together the cylinder-piston units (11), (17) through which the oil passes for moving the bar (1) into its rest position, and a free-wheeling linkage (20, 23, 24) is disposed between the bar (1) and head (6, 7) to enable the head (6, 7) to rotate in only one direction, and is associated with a positioning element (25) which fixes said head in position at every half revolution.

5 Claims, 3 Drawing Figures

DEVICE FOR SELECTING THE TOOLS OF THE TOOL CARRYING HEAD OF TIRE REMOVAL MACHINES IN GENERAL

SUMMARY OF THE INVENTION

This patent relates to a device for rotating the tool carrying head of tyre removal machines in general when said head is completely external to the outer boundary of the tyre which is being worked upon at that moment.

The invention is suitable for any type of tyre removal machine provided that its tool carrying head is moved into its non-working position by a double-acting cylinder-piston unit.

Tyre removal machines for large tyres are for example known in which the tool carrying head is slidably mounted in a telescopic manner at the end of a bar which can swivel between a working position, with the head close to the tyre, and a rest position, withdrawn from the tyre.

In said known machines, the tool carrying head is constituted by an idle bead disengagement disc of known type and a likewise known profiled extraction/mounting lever disposed on the other side of the head, and the operator is required to select the tool to be used by rotating the head through 180° about its support.

In these known types of tyre removal machine, between the swivelling bar which carries the head and the tool carrying head itself there is provided a transverse locking bolt which has to be extracted and inserted each time the tool to be used is changed by rotating the head.

As stated, in the aforesaid known tyre removal machines, the tool selection is made by the operator, who can obviously only do this when the head is in its non-working position, ie external to the outer boundary of the wheel which is being worked upon at that moment.

The present patent provides and protects a device which, under the control of the operator, is able to select the tools of a tool carrying head for tyre removal machines of the aforesaid type.

This is attained according to the invention by causing the tool carrying head to rotate about its support bar by means of a double-acting hydraulic cylinder-piston unit, which is connected in parallel with the double-acting hydraulic cylinder-piston unit which controls the swivel movements of the bar carrying the head.

According to the invention, said two cylinder-piston units are connected together at that end which is fed in order to swivel the bar into its rest position, the connection being made by way of a hydraulic sequence valve.

Furthermore, between the head and the respective bar there is disposed a free-wheeling device which allows rotation in only one direction, and which is combined with a positioning and locking device which fixes the head in position at every half revolution.

The constructional characteristics and merits of the invention will be more apparent from the description given hereinafter with reference to the figures of the accompanying drawings, which illustrate a preferred embodiment thereof by way of non-limiting example, relating to the tyre removal machine described in U.S. patent application Ser. No. 608111 filed on May 8, 1984 in the name of the present applicant.

Figure 1:
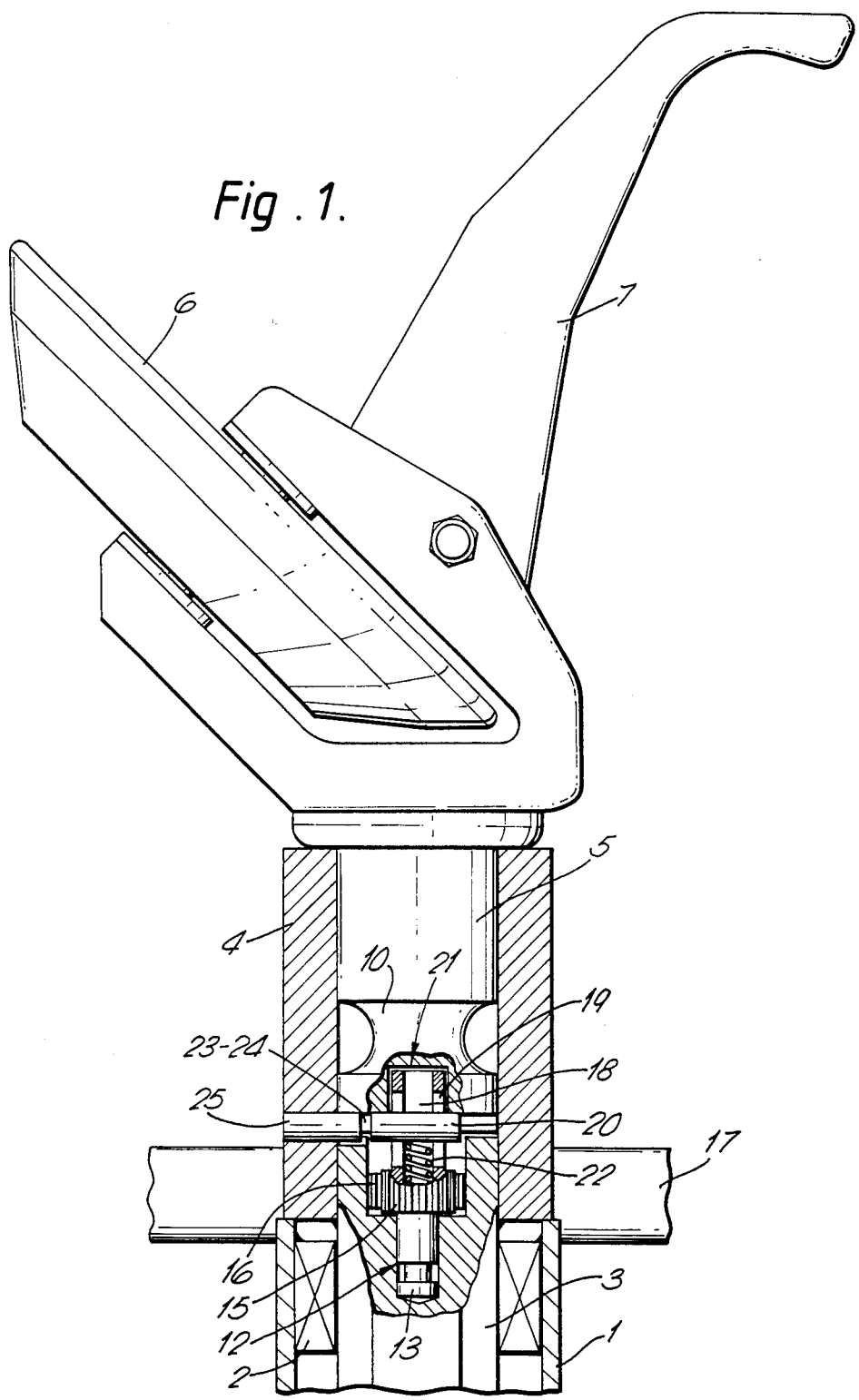
FIG. 1 is a partial axial section through the bar for supporting a tool carrying head, and with the selection device according to the invention associated therewith.
Figure 2:
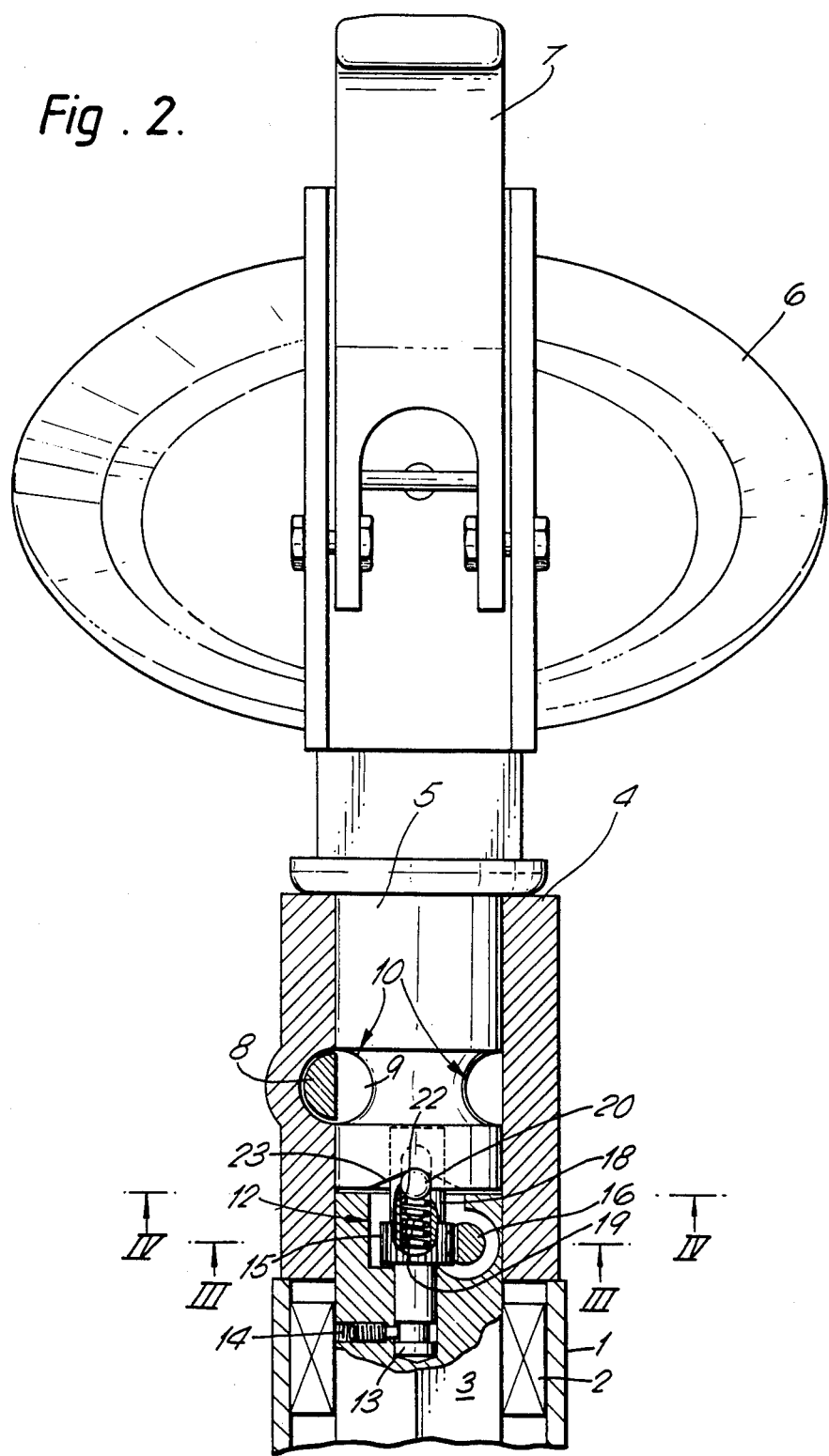
FIG. 2 is a section similar to the preceding, but orthogonal thereto.

Said figures, and in particular FIGS. 1 and 2, show a tubular bar 1 in which there is slidably mounted, on suitable guides 2, a prismatic rod 3, to the front end of which there is fixed a sleeve 4 arranged to abut against the tubular bar 1.

In the sleeve 4 there is inserted a rotatable pivot 5 which supports a tool carrying head of known type, comprising an idle cyathiform disc 6 for bead disengagement of the tyres, and a profiled lever 7 for extracting/mounting said tyres.

There is also rotatably mounted in the sleeve 4 a chordal pin 8 comprising a transverse slot 9 (FIG. 2) shaped as a sector of a cylindrical surface having the same diameter as the pivot 5.

This latter is provided with two diametrically opposing semicylindrical chordal grooves 10 having the same diameter as the chordal pin 8.

The purpose of said chordal pin 8 is to torsionally lock/release the pivot 5, as clearly described in said U.S. patent application Ser. No. 608111.

The said patent application describes a hydraulic cylinder-piston unit for sliding the rod 3 along the tubular bar 1, for swivelling this latter in a vertical plane with the aid of other elements not shown on the figure, and for locking/releasing the chordal pin 8 by way of a convenient lever mechanism. The bar 1 is swivelled in a vertical plane by a double-acting cylinder-piston unit 11 shown diagrammatically in FIG. 3.

In general, according to the invention, the cylinder-piston unit 11 is that cylinder-piston unit of a tyre removal machine which moves the tool carrying head into and away from its working position.

Figure 3:
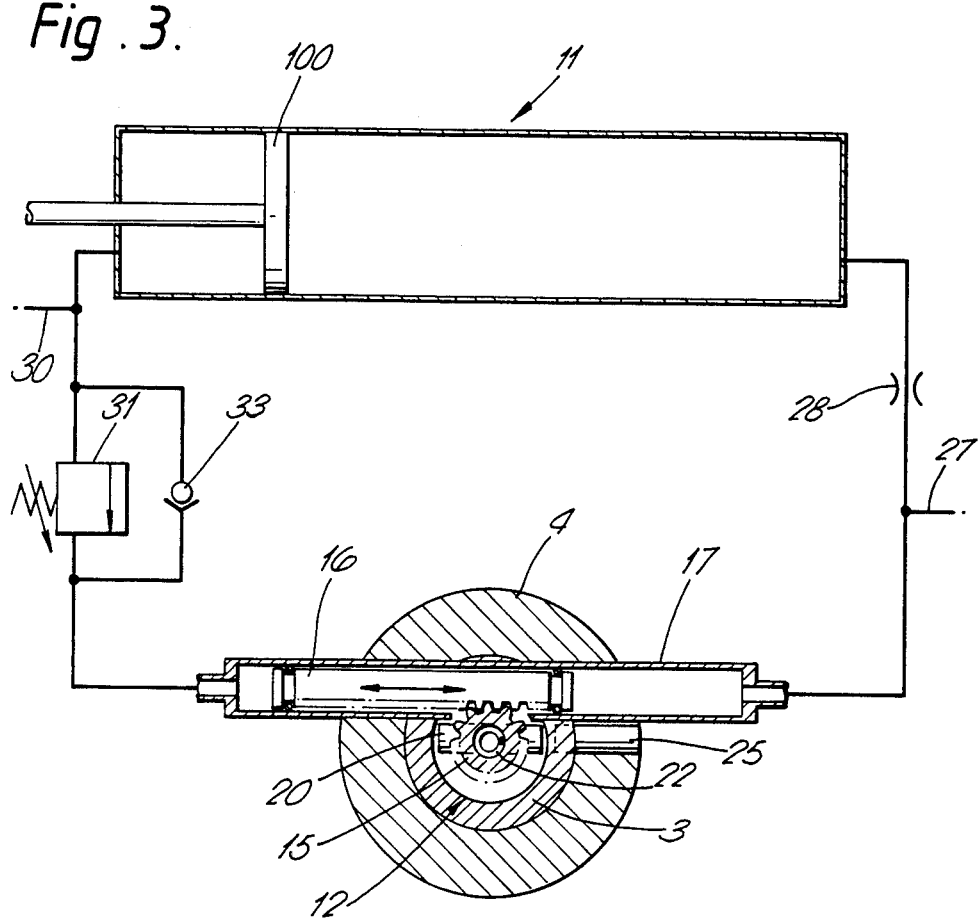
FIG. 3 is a section on the line III—III of FIG. 2.

With reference to the accompanying FIGS. 1 to 3, it can be seen that at the top of the rod 3 there is provided a blind coaxial bore 12 of differential cross-section.

In the lower narrower part of said bore 12 there is rotatably mounted a cylindrical shank 13, locked axially be means of a transverse grub screw 14 (FIG. 2), and the upper wider part of said bore 12 contains a pinion 15 which is rigid with said shank 13.

The pinion 15 engages a rack rod 16 constituting a portion of the rod which joins together two end pistons slidable inside, and at the ends of, a cylinder 17 which is fixed transversely to the sleeve 4.

The maximum extent of travel of the rack 16 is such as to cause the pinion 15 to make a total rotation of 180°.

Furthermore, from the upper face of the pinion 15 there projects a coaxial bush 18 (FIGS. 1 and 2) provided with two diametrically opposing longitudinal slots 19 (FIG. 2), into which there is slidably inserted, with an exact fit, a transverse shaft 20 which passes to the outside of the outer cylindrical surface of the bush 18 (FIG. 1).

The top of bush 18 is received in a respective blind bore 21 (FIG. 1) provided in the rotatable support pivot 5 for the tool carrying head, and inside said bush 18 there is housed a compression spring 22 which urges the shaft 20 towards said rotatable support pivot 5.

When the pivot 5 is in one of its opposing operating positions, the projecting ends of the shaft 20 are received by the base of two diametrically opposing inclined recess surfaces 23 (FIG. 4) provided on the lower transverse face of the pivot 5.

At their point of maximum depth, the inclined surfaces 23 terminate with a transverse wall 24 which constitutes the member for driving the rotatable pivot 5.

Figure 4:
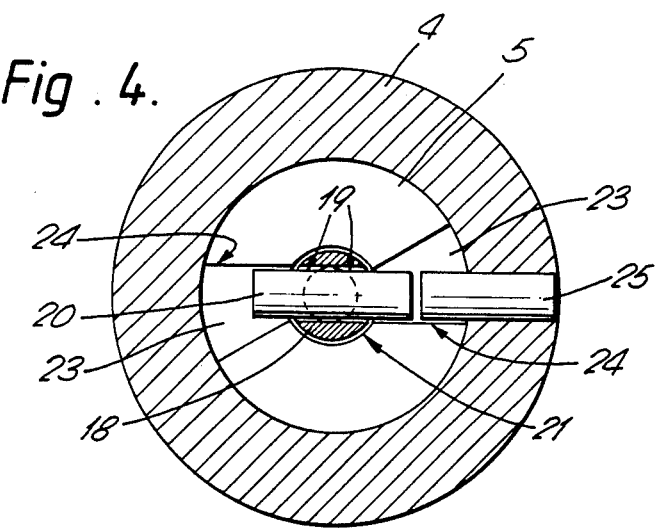
FIG. 4 is a section on the line IV—IV of FIG. 2.

Finally, the sleeve 4 is provided with a transverse positioning peg 25 (FIGS. 1, 3 and 4) which extends into said sleeve 4 in order to interfere with the two inclined surfaces of the lower end of the rotatable pivot 5 (FIG. 4). FIG. 3 shows that position assumed by the two cylinder-piston units 11 and 17 when the bar 1 has been swivelled into a position close to the wheel rim. When the bar together with its group of tools is to be withdrawn from the wheel rim being worked upon, oil is fed to the chamber to the left of the piston 11. If the orientation of the tool is also to be changed, the oil feed through the pipe 30 is continued, and the overpressure which is created when the piston 100 reaches its end-of-stroke position overcomes the threshold of the sequence valve 31, thus also feeding the chamber to the left of the piston 17.

This latter, by moving to the right, causes the pivot 5 to rotate through 180°. If however the orientation of the tool is not to be changed, the feed through 30 is interrupted as soon as the bar has swivelled to the end of its stroke. In contrast, in order to cause the bar together with its group of tools to approach the tyre being worked upon, oil is fed through the pipe 27, which is connected to the right hand ends of the two cylinder-piston units 11 and 17. Because of the constriction 28, the unit 17 is the first to operate, and causes the rack 16 to return towards the left, but without driving the pivot 5 which is locked by the peg 25, whereas the shaft 20 slides downwards on the inclined surfaces 23.

The unit 11 is then fed, to cause the bar 1 and the relative tools to approach the wheel rim.

The bypass 33, connected across the valve 31, allows proper discharge of the oil from the left hand end of the unit 17.

It should also be noted that as the pivot 5 can as stated rotate only in one direction, it must be free to slide axially in order to overcome, in the direction of rotation, the fixed peg 25 which slides against the inclined surfaces 23.

The pivot 5 is locked by the chordal pin 8 until the bar 1 has reached its rest position, in which the head 6, 7 can also be rotated manually.

This is particularly advantageous, because it enables the tools to be selected even when the device of the invention is damaged.

What is claimed is:

1. In a tire changing machine of the type in which a tool carrying head is mounted on a bar which can swivel under the action of a first double-acting hydraulic cylinder-piston unit between a working position close to the tire and a rest position remote from the tire, and in which the tool carrying head is mounted to pivot so that different tools on the head can be pivoted to an operating position, the improvement comprising, a pinion gear rotatable supported by the bar, a rack engaging said pinion, a second double-acting cylinder-piston connected to said rack for reciprocating the rack to alternately rotate the pinion in a forward direction and a reverse direction, a free-wheeling one way drive between said pinion and the tool carrying head for rotating said head only when the pinion is rotated in said first direction, cooperating means between said head and said bar for retaining the head at each one-half revolution thereof, and wherein, said second double-acting hydraulic cylinder-piston unit is connected to the hydraulic line which supplies pressurized fluid to the first double-acting hydraulic cylinder-piston unit to swivel the head to the rest position, by a hydraulic sequence valve to direct fluid to the second cylinder and rotate said head, after the head is moved to the rest position by the first cylinder.

2. A tire changing machine as claimed in claim 1, wherein said second hydraulic cylinder-piston unit is fixed transversely to said bar and houses a rod on which said rack is formed and which connects together two end pistons of the second cylinder, and wherein said pinion is rotatably mounted within the bar.

3. A tire changing machine as claimed in claim 1, wherein a bypass valve for discharging the oil from the second cylinder-piston unit is connected across said hydraulic sequence valve, and a constriction is provided in a pipe supplying fluid to the first cylinder, for moving the bar into its working position, downstream of a pipe supplying fluid to the second cylinder to rotate the pinion in the reverse direction, to reposition the second cylinder before swivewing to the operation position.

4. A tire changing machine as claimed in claim 1, wherein said free-wheeling linkage comprises a transverse shaft slidably mounted in two diametrically opposing longitudinal slots in a coaxial bushing coaxial with and extending from the pinion, said transverse shaft being elastically urged towards a rotatable pivot and projecting beyond the bush so that it becomes inserted into two diametrically opposing recesses provided in a free end of the rotatable pivot and in an inclined surface in an end of the pivot.

5. A tire changing machine as claimed in claim 1, wherein said retaining means comprises a lateral transverse pin which is fixed to the bar, into which it extends to seat in either one of the two opposing recesses.

* * * * *